No. 854,825. PATENTED MAY 28, 1907.
H. D. JAMES.
SYSTEM OF ELECTRIC MOTOR CONTROL.
APPLICATION FILED AUG. 2, 1905.
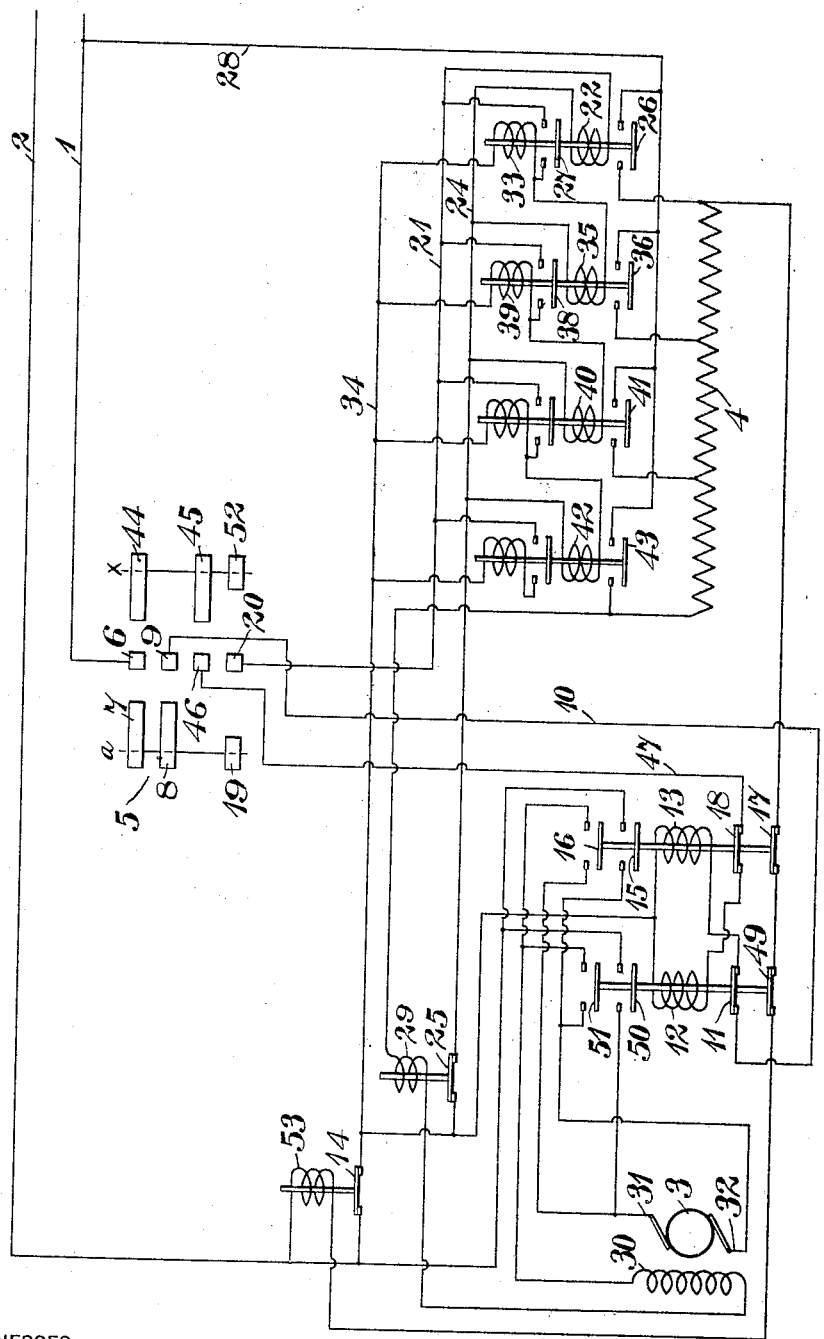
WITNESSES:
Fred H. Miller
R. J. Dearborn
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

No. 854,825.     Specification of Letters Patent.     Patented May 28, 1907.

Application filed August 2, 1905. Serial No. 272,400.

*To all whom it may concern:*

Be it known that I, HENRY D. JAMES, a citizen of the United States, and a resident of Pittsburg, in the county of Allegheny and State of Pennsylvania, have invented a new and useful Improvement in Systems of Electric-Motor Control, of which the following is a specification.

My invention relates to systems of electric motor control and has special reference to such systems as embody automatic means for accelerating the motor that comprises a plurality of electrically controlled accelerating switches.

The object of my invention is to provide means for preventing the reversal of the current supplied to the motor while any or all of the accelerating switches are closed that shall be simple and durable in construction and effective in operation.

In systems of electric motor control that are provided with a plurality of switches actuated electrically or electro-pneumatically from a main line shunt circuit, or from an independent circuit of any kind, and governed by a master controller to automatically close the switches in a predetermined order, thereby cutting out the motor-starting resistance, or raising the applied voltage by other well known means, it is not unusual for some one or more of such switches to stick or consume a considerable amount of time in opening, after the master controller is thrown to the "off" position. It is therefore desirable to provide means for preventing the application of current energy in the reverse direction when any one of the control switches is in its closed position, since excessive currents might otherwise be supplied to the motor and either actuate protective devices to open the circuit or damage the motor.

Adequate means that are adapted to effect the aforesaid advantages are provided by my invention, which is illustrated in the single figure of the accompanying drawing, which is a diagrammatic view of the control system arranged in accordance therewith.

Although I have illustrated a specific circuit arrangement in connection with a single motor that is supplied with direct current energy, I desire that my invention shall be construed to cover and include various means which effect similar results in connection with one or more direct or alternating current motors.

Referring to the drawing, electrical energy is supplied from a main line circuit 1—2 to a motor 3 through all or a portion of a resistance 4, the amount of resistance in the circuit and the motor connections being governed by a master controller 5, which has a forward position $a$ and a reverse position $x$.

As the controller approaches the position $a$, circuit is first completed from the line conductor 1 through a contact finger 6, contact segments 7 and 8, contact finger 9, conductor 10, a relay switch 11 that is actuated by an electro-magnet coil 12, an electro-magnet coil 13 and a switch 14 to the negative line conductor 2. The electro-magnet coil 13, being thus energized, closes two switches 15 and 16 and opens two relay switches 17 and 18, the movable contact members of said switches being attached to the armature of the magnet. When the controller 5 reaches the position $a$, a circuit is also completed from the line conductor 1 through contact finger 6, contact ring segments 7 and 19, contact finger 20, conductor 21, an electro-magnet coil 22, a conductor 24, a limit switch 25 and the switch 14 to the negative line conductor 2. The electro-magnet coil 22, being thus energized closes a main line switch 26 and a relay switch 27, the former of which completes a connection from the line conductor 1 through a conductor 28, the switch 26, resistance 4, an electro-magnet winding 29 of the limit switch 25, a series field magnet winding 30 of the motor 3, and the switch 16 to an armature terminal 31 of the motor 3, the circuit being completed from the opposite armature terminal 32 of the motor, through the switch 15, to the negative line conductor 2. In this way the motor 3 is first connected across the line in series with the complete resistance 4.

The switch 26 is held in its closed position by a retaining coil 33 which is supplied with energy from the conductor 21 through the relay switch 27, a circuit being completed through a conductor 34 and the switch 14 to the negative line conductor 2. A circuit is also completed from the conductor 21, through the relay switch 27 and an actuating coil 35 of a switch 36, to the conductor 24. When the line switch 26 is first closed, the current supplied to the motor 3, through the winding 29 of the limit switch 25, is sufficient to open the limit switch 25, which keeps the circuit through the magnet coil 22 open until the motor 3 accelerates and the current falls below a predeterimned value, when the switch 25 is again closed.

The deënergizing of the coil 22 has no effect upon the position of switch 26, since the retaining coil 33 holds it in its closed position, but it is evidently impossible for the magnet coil 35 to be energized, and thus increase the voltage applied to the motor, until the limit switch 25 is closed. The coil 35, when energized, closes the switches 36 and 38, which serve, respectively, to short-circuit a portion of the resistance 4 and to energize a retaining coil 39, which corresponnds to coil 33, and to complete a circuit from the conductor 21 through the switch 38 and an electro-magnet coil 40 to the conductor 24.

As explained in connection with the magnets 22 and 35, the coil 40 cannot be energized until the current supplied to the motor falls below a predetermined value. When this condition is attained, the circuit is completed through the coil 40 to close the switch 41 and thereby short-circuit another portion of the resistance 4. The similar action of an electro-magnet 42 and its switch 43 serves to short-circuit the remainder of the resistance 4, when the supply current has reached a suitable value. The operation of the relay switches which coöperate with the switches 41 and 43 will be understood without further description.

In order to reverse the direction of rotation of the motor, the master controller is moved to the position x and a circuit is first completed from the main line conductor 1 through the contact finger 6, ring segments 44 and 45, a contact finger 46, a conductor 47, switch 18, magnet coil 12 and the switch 14 to the negative line conductor 2. The magnet coil 12, being thus energized, opens switches 11 and 49 and closes switches 50 and 51, and when the controller 5 reaches position x, the contact finger 20 is supplied with energy from a ring segment 52 and the switch 26 is closed as before, so that energy is supplied from the conductor 28 through the switch 26, resistance 4, the magnet coil 29 of the limit switch 25, the series field magnet winding 30 and the switch 51, to the armature terminal 32 of the motor 3, connections being completed from the opposite armature terminal 31 through the switch 50 to the negative line terminal 2. In this way the direction in which the current flows through the motor armature is reversed, but the action of the accelerating switches takes place as hereinbefore explained.

When the master controller 7 is moved from the forward position a to the "off" position and then to the reverse position x, excessive current would be ordinarily supplied to the motor if any of the armatures of the electro-magnets 22, 35, 40 or 42 remained closed. To obviate this possibility, the switches 17 and 49 which normally come to the closed position when the master controller passes through the "off" position, complete a circuit, in case any of the accelerating switches are still closed, through a magnet coil 53, which serves to open the switch 14 and to prevent the completion of the motor circuit until the switch which had failed to operate is opened.

I claim as my invention:

1. The combination with a translating device and a plurality of separately actuated accelerating switches, of means for preventing reversal of the direction of current flow in said device while any of the switches are closed.

2. The combination with a translating device, a resistance in circuit therewith, and a plurality of independently actuated switches for removing the same from the circuit, of means for preventing reversal of the direction of current flow in said device while any of said switches are closed.

3. The combination with a translating device, a resistance in circuit therewith, and a plurality of independently actuated switches for removing the same from the circuit, of means for governing the direction of current flow in said device, and a switch for preventing operation thereof to effect reversal of the direction of current flow while any of the aforesaid switches are closed.

4. The combination with a translating device, a resistance in circuit therewith, and a plurality of independently actuated switches for removing the same from the circuit, of switches for governing the direction of current flow in said device, controlling magnet windings therefor, and a switch in circuit with the controlling magnet windings that prevents energizing thereof while any of the resistance governing switches are closed.

5. The combination with a translating device, a resistance in circuit therewith, and a plurality of independently actuated switches for removing the same from the circuit, of switches for governing the direction of current flow in said device, controlling magnet windings therefor, a relay switch in circuit with the controlling magnet windings, and a controlling magnet winding for the relay switch the circuit of which becomes established when the current direction governing switches and one or more of the resistance governing switches are closed.

6. The combination with a translating device, a resistance in circuit therewith, and a plurality of independently actuated switches for removing the same from the circuit, of switches for governing the direction of current flow in said device, controlling magnet windings therefor, a relay switch in circuit with the controlling magnet windings, a controlling magnet winding for the relay switch the circuit of which is governed by the resistance switches and by auxiliary switches that are operated by the current direction governing switches.

7. In a control system, the combination with an electric motor, a resistance in series therewith, a plurality of electrically operated switches that may short-circuit portions of the resistance, a reversing switch for the motor armature and a master controller that governs the action of said switches, of means for preventing the reversal of the current supplied to the motor armature while any one of the resistance portions is short-circuited, said means comprising a plurality of relay switches which complete the circuit connection through the closed switch and through a circuit interrupting device that prevents the completion of the motor circuit.

8. The combination with an electric motor and a plurality of accelerating switches, of means for preventing the reversal of the current applied to the motor while any of said switches are closed, said means comprising a plurality of relay switches which complete the circuit connection through the closed switch and through a circuit interrupting device that prevents the completion of the motor circuit.

9. In a control system, the combination with an electric motor and means for varying the voltage applied thereto, that is controlled by a plurality of switches, of means for preventing the reversal of the current applied to said motor while any one of said switches is closed, said means comprising a plurality of relay switches which complete the circuit connection through the closed switch and through a circuit interrupting device that prevents the completion of the motor circuit.

10. In a control system, the combination with an electric motor, a resistance in series circuit therewith, a plurality of switches that are controlled by a master controller and automatically short-circuits portions of the resistance in a predetermined order, of means for preventing the reversal of the current applied to said motor when any one of said switches is closed, said means comprising a plurality of relay switches that complete the circuit connection through the closed switch and through a circuit interrupting device that prevents the completion of the motor circuit.

11. The combination with a supply circuit, a translating device and a resistance, of a switch for connecting the translating device to the supply circuit, a plurality of switches for removing the resistance from the circuit of the translating device in gradations, and means controlled thereby for preventing closure of the aforesaid switch while any of the latter switches are closed.

12. The combination with a supply circuit, a translating device and a resistance, of a switch for connecting the translating device to the supply circuit, an operating magnet winding therefor, one or more switches for removing the resistance from the circuit of the translating device, and means controlled thereby for preventing establishment of the circuit of the said controlling magnet winding while any of the resistance removing switches are closed.

In testimony whereof, I have hereunto subscribed my name this 29th day of July 1905.

HENRY D. JAMES.

Witnesses:
R. W. COPELAND,
BIRNEY HINES.